(12) United States Patent
Sprenger et al.

(10) Patent No.: US 10,620,003 B2
(45) Date of Patent: Apr. 14, 2020

(54) ACTIVE DAMPING OF A MEASURING DEVICE

(71) Applicant: HEXAGON TECHNOLOGY CENTER GMBH, Heerbrugg (CH)

(72) Inventors: Bernhard Sprenger, Widnau (CH); Claudio Iseli, Au (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 242 days.

(21) Appl. No.: 15/570,360

(22) PCT Filed: Apr. 28, 2015

(86) PCT No.: PCT/EP2015/059173
§ 371 (c)(1),
(2) Date: Oct. 29, 2017

(87) PCT Pub. No.: WO2016/173625
PCT Pub. Date: Nov. 3, 2016

(65) Prior Publication Data
US 2018/0149473 A1    May 31, 2018

(51) Int. Cl.
*G01B 21/04* (2006.01)
*G01B 5/008* (2006.01)
(Continued)

(52) U.S. Cl.
CPC .......... *G01B 21/045* (2013.01); *G01B 5/008* (2013.01); *G01P 15/0802* (2013.01);
(Continued)

(58) Field of Classification Search
CPC ... G01B 21/045; G01B 5/008; G01P 15/0802; G05B 13/04; G05B 19/402; G05B 2219/39401
(Continued)

(56) References Cited

U.S. PATENT DOCUMENTS 9,086,262 B2 * 7/2015 Pettersson ............ G01B 21/045
9,593,927 B2 * 3/2017 Sprenger ................ G01B 5/008
(Continued)

FOREIGN PATENT DOCUMENTS

CN    103968790 A    8/2014
EP    1 559 990 A2   8/2005
(Continued)

OTHER PUBLICATIONS

D'Errico, "À la Kalman Filtering for Metrology Tool With Application to Coordinate Measuring Machines", IEEE Transactions on Industrial Electronics, vol. 59, Issue 11, Nov. 2012, pp. 4377-4382.

*Primary Examiner* — John H Le
(74) *Attorney, Agent, or Firm* — Maschoff Brennan

(57) ABSTRACT

Method for providing avoiding of excitations of oscillations of a measuring machine and/or for reducing or damping such oscillations by actively controlling a driving unit of the measuring machine or actively controlling an actuation of an additionally attached actuator. The method using information about an actual state of the measuring device, the actual state is derived based on a dynamic model and/or by use of a suitable sensor unit. A state controller, an actuator or a frequency-filtering element are used for counteracting or preventing oscillations.

26 Claims, 3 Drawing Sheets

(51) Int. Cl.
  *G01P 15/08* (2006.01)
  *G05B 19/402* (2006.01)
  *G05B 13/04* (2006.01)

(52) U.S. Cl.
  CPC ........... *G05B 13/04* (2013.01); *G05B 19/402* (2013.01); *G05B 2219/39401* (2013.01)

(58) Field of Classification Search
  USPC .............. 702/152, 155, 95; 33/503; 356/601
  See application file for complete search history.

(56) References Cited

U.S. PATENT DOCUMENTS

| | | | |
|---|---|---|---|
| 9,593,928 B2* | 3/2017 | Sprenger | G01B 21/045 |
| 2009/0271997 A1 | 11/2009 | Ruck et al. | |
| 2012/0105866 A1* | 5/2012 | Pettersson | G01B 21/045 |
| | | | 356/601 |

FOREIGN PATENT DOCUMENTS

| | | |
|---|---|---|
| EP | 1 687 589 A1 | 8/2006 |
| EP | 2 505 956 A1 | 10/2012 |
| EP | 2 762 830 A1 | 8/2014 |
| EP | 2 762 831 A1 | 8/2014 |
| EP | 2762829 A1 | 8/2014 |
| GB | 2 425 840 A | 11/2006 |

\* cited by examiner

ACTIVE DAMPING OF A MEASURING DEVICE

FIELD OF THE INVENTION

The present invention generally pertains to approaches for dynamical compensations of dynamical effects occurring by movement of a measuring device, in particular of a coordinate measuring machine, and to respective devices being adapted for proving such an approach.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe) carried by the probe head.

In a simple form of the machine a suitable transducer mounted parallel to each axis is able to determine the position of the probe head relative to a base of the machine and, therefore, to determine the coordinates of a measurement point on the object being approached by the sensor. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with an improved measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite also makes the machine and the movable frame elements quite heavy. The high weight on the other side also requires high forces for a decent acceleration.

There are still several possible sources of error, if such technique is employed. Resonances or vibrations of machine parts when moving one frame component relative to another component are just two examples for dynamic errors. Moreover, errors emerging from vibrations coming from outside the machine are to be considered. Additionally, static errors like lack of straightness in movement and of orthogonality of the axes or lateral offset in the linear drive mechanisms may occur.

According to many approaches the mentioned errors are only analyzed statically, although they also comprise dynamic factors which are dependent on the movement of the axes, in particular dependent on the position, speed, acceleration and jerk when moving the axis. With the speed-dependent calibration, this fact is taken into account in a rather simple and inflexible way. While the static errors can be numerically reduced by the use of position calibration matrices, things get much more complex when trying to compensate the dynamic errors.

In that context, for example, it has to be considered that accelerations of one axis of the machine (which can move further perpendicular axes and the probe head), can cause linear and angular dynamic deflections of the whole frame of the coordinate measuring machine, which in turn cause measurement uncertainties and errors. These dynamic measurement errors may be reduced by taking measurements at low accelerations, e.g. by a consequently optimized trajectory of desired movement.

Known approaches are trying to suppress deflections, vibrations and/or oscillations caused by the acceleration of the machine by a technology called input-shaping, which controls the regulating variable, e.g. the force or current of a propulsion motor, in such a way as to bypass some mechanical resonances and avoid a stimulation of resonance frequencies or even actively counterforce oscillations by a accordingly manipulated variable on the output to the driving actuator control.

Also model predictive control, as a form of control in which the current control action is obtained by solving at each sampling instant a finite horizon open-loop optimal control problem, using the current state of the plant as the initial state, can be applied to CMMs. The optimisation yields an optimal control sequence and the first control in the sequence is then applied to the plant.

Exemplarily for error handling, EP 1 559 990 discloses a coordinate measuring system and method of correcting coordinates measured in a coordinate measuring machine, measuring geometrical errors while parts with various weights are mounted on the coordinate measuring machine. Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant and determining the measurement error at the surface sensing device caused by the load.

Another approach for error correction of work piece measurements with a coordinate measuring machine (CMM) is disclosed in GB 2 425 840. Thereby, position measurements are taken with a work piece sensing probe, in which means of measuring acceleration are provided. The measurements are corrected for both high frequency (unrepeatable) errors such as those due to vibration, and low frequency (repeatable) errors such as those due to centrifugal forces on the probe. The correction method comprises measuring the work piece, determining repeatable measurement errors from a predetermined error function, error map or error look-up table, measuring acceleration and calculating unrepeatable measurement errors, combining the first and second measurement errors to determine total errors and correcting the work piece measurements using the total errors. The predetermined error map is calculated using an artefact of known dimensions.

For handling above mentioned errors, in particular dynamic errors, usually a suitable model of the CMM is to be defined, wherein a positioning behaviour of especially the frame structure of the CMM is enabled to be described based on that model. Exemplarily, a look-up table may be defined in order to lookup a correction value correlated with an actual positioning of the frame components of the CMM. Such modelling of a CMM becomes more important along with weight (and stiffness) reduction of CMM-parts.

Weight reduction is a main topic relating to the designs of coordinate measuring machines, as if the machine components are built comprising less weight (and less stiffness) faster positioning of respective components can be achieved by causing fewer force affecting the coordinate measuring machine. On the other hand the influence of machine vibrations and torsions caused by reduced stiffness and (faster) movement of the machine components might increase with weight reduction of these parts. Thus, uncertainties of derived measurement values and errors occurring from such deformations and vibrations might increase accordingly.

An approach for a dynamic model which provides precise description of also oscillation errors due to less stiff machine constructions is known from EP 2 762 830.

However, by use of such modelling approach still errors occurring from movements of machine parts or from external influences remain. Again with view to build measuring machines less heavy and thus provide higher moving speeds for measuring designated work pieces, oscillations of the machine remain significantly influencing measured coordinates or positions.

SUMMARY

It is therefore an object of some embodiments of the present invention to provide an improved method and machine for avoiding excitation of vibrations or oscillations of at least a part of a measuring device.

A further object of some embodiments of the present invention is to provide methods to reduce occurring oscillation effects.

Yet another object of some embodiments of the present invention is to provide an improved method for determining machine vibrations and/or deformations and, particularly, for compensation of positional errors caused by such vibrations and/or deformations.

The some embodiments of invention relate to a method for controlling of a relative movement of at least two structural components of a measuring device, wherein the measuring device comprises a driving unit for providing movability at least of the two structural components relative to each other. The method comprises providing a dynamic state information for at least one of the two structural components by means of a dynamic model with a set of model state variables, the model state variables being related to a set of physical properties of at least one of the two structural components and providing determination of an actual state of at least one of the two structural components. The dynamic model may be based on a Kalman filter and/or implemented using respective observers. The model state variables thus may be derived by use of such filter or observer.

Moreover, a model-based state controller for controlling the driving unit is provided, the model-based state controller comprises a set of at least one controlling state variable which depends on the actual state. In particular, the controlling state variable is represented by the actual state of the measuring device or of a structural component of it. At least one controlling state variable (or actual state respectively) of the set of at least one controlling state variable is derived by a calculation at least based on the dynamic model.

A controlling parameter is generated by use of the state controller based on the at least one derived controlling state variable, the controlling parameter being adapted to provide driving the driving unit so that the at least one derived controlling state variable and/or actual state is affected in a defined manner.

Thus, according to that approach, a relative movement of structural components of a measuring device like a CMM is improved by using a state-space controller together with a dynamic model (providing a precise description of the machine state) for controlling actuations of the driving unit.

According to an embodiment of the invention the controlling parameter is applied to the driving unit so that the structural components are moved in defined manner relative to each other.

The above method according to the invention provides direct management of natural frequencies (resonances) of the system, for example a damping with respect to the frequencies. Additionally, disturbance from the environment can be rejected with e.g. phase shifted application of force.

The estimated or monitored states can be used to estimate positions and/or velocities for position and/or velocity control loops. Furthermore the states can be used as state variables of the state-space controller or can be used to actively damp natural frequencies by overall control laws or to correct a CMM pose according to deflection values.

Actual states can be measured or estimated based on the model with observers or Kalman filters.

According to a specific embodiment of the invention, two state estimators are used, one for the control loop (e.g. one element for the Z-Ram, to compensate low frequency effects with active elements) and one for providing accuracy or compensation of the machine (e.g. five elements for the Z-Ram; to compensate bending oscillation at higher frequencies and/or with higher accuracy).

In particular, frequencies of up to 1 kHz—with view to state of the art CMMs—are relevant for the accuracy of the measurement point.

Concerning the determination of the controlling state variable, the at least one controlling state variable can be derived based also on a model-based estimation (using the dynamic model) or on a measurement and/or on monitoring the model state variable, in particular monitoring changes of the model state variable.

Moreover, a particular controlling state variable of the set of at least one controlling state variable can be derived at least by a model-based estimation or measurement and/or by monitoring the model state variable.

Furthermore, regarding determination of the actual state, the actual state can be derived by a calculation based on the dynamic model.

Alternatively or additionally, at least one controlling state variable of the set of at least one controlling state variable is derived by measuring an excitation and/or an impact on the measuring device with a sensor and/or by calculation from a path trajectory, in particular wherein the at least one controlling state variable is derived from determining the respective physical property.

According to a further embodiment of the invention, the actual state is derived, in particular the change of the actual state is determined, by measuring or estimating at least one of the physical properties and, therefrom, deriving at least one corresponding actual controlling state variable. In particular, a change of the at the actual state is caused by a change of at least one of the physical properties, particularly caused by an applied force affecting the measuring device, in particular by moving the structural components. In particular, estimating the at least one of the physical properties is provided by a set of observers (e.g. using Kalman filtering).

As already mentioned above, the at least one controlling state variable may correspond to the actual state, i.e. the controlling state variable is of identical type and value of the actual state.

According to a preferred embodiment of the invention, the state controller comprises an observer which provides determination of the at least one controlling state variable, in particular wherein the observer is provided by a Kalman-Filter.

Therefore, above method covers the usage of state variables generated by observers to specifically enhance the control performance of e.g. a CMM, especially the usage of estimated states to actively damp the system. This is provided by the overall control concept using a dynamic model and a state controller.

With view to the implementation of the dynamic model and the state-space controller—according to an embodiment of the invention—the dynamic model and the model-based state controller are implemented in combined manner, in particular wherein the dynamic model represents an implemented part of the state controller. Thus, there is not a defined separation of these logical parts of the overall control of the system, but the controlling provided in an integrated manner.

The dynamic model furthermore provides the possibility of a precise deriving of several machine states at any instance of time. Thus, an actual deflection of the measuring device can be derived based on the dynamic model, in particular wherein an actual pose of the measuring device can be corrected based on the derived deflection.

Moreover, an actual velocity of at least a part of the measuring device can be derived based on the dynamic model and/or an actual position of a designated point of the measuring device can be derived based on the dynamic model and/or measuring errors can be compensated based on the dynamic model.

The model-based concept by use of a state controller as described above is applicable to various kinds of metrology machines, e.g. coordinate measuring machines, total stations, laser trackers or laser scanners.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm. Furthermore, the invention also relates to coordinate measuring machines with rotational axis, such as the Scara-type and delta kinematics (parallel kinematics) and machine with articulated heads.

Now more specifically referring to the types of measuring devices being controllable according to the state-space controlled approaches of above, the measuring device can be embodied as a coordinate measuring machine with a base, a probe head, a machine structure for linking the probe head to the base and at least one drive mechanism for providing movability of the probe head relative to the base, the drive mechanism representing the driving unit. The structural components are embodied as the base, the probe head and/or the machine structure.

Alternatively, the measuring device can be embodied as a geodetic measuring instrument, in particular laser scanner, laser tracker or total station, with a support structure being mounted on a base of the measuring instrument such that the support structure is pivotable about a first axis defined by the base and a source of electromagnetic radiation for generating a measuring beam. Furthermore, the geodetic measuring instrument comprises a directing unit for directing the measuring beam, the directing unit being arranged at the support structure as to provide pivotability of the directing unit about a second axis defined by the support structure, the second axis being basically perpendicular to the first axis, and a measuring functionality for providing directing and guiding of the measuring beam in a predefined manner and measuring distances correspondingly.

According to of the state-controlled approach of above, the at least one model state variable can define at least one or a combination of the following factors and/or a change of the respective factors of at least the part of the measuring device:

acceleration, in particular rotational,
velocity, in particular rotational,
position,
bending,
deformation,
displacement,
orientation,
temperature,
humidity,
torque,
force,
stiffness,
stiffness distribution,
mass and/or
mass distribution.

At least one of those factors may be considered by the dynamic model using a respective observer or Kalman filtering.

Moreover, the change of the at least one controlling state variable or the model state variable may be derived based on at least one of the following physical properties and/or a change of the respective physical properties, in particular by sensor-based measuring of at least one of the physical properties:

acceleration, in particular rotational,
velocity, in particular rotational,
position,
deflection,
torque and/or
force.

According to a particular embodiment of the invention, the physical properties are monitored, in particular measured, and the actual state of at least the part of the measuring device is calculated based on at least the set of model state variables and the monitored physical properties.

The invention also related to a computer programme product having computer-executable instructions for performing the method as described above, in particular when run on a controlling and processing unit of a coordinate measuring machine.

Some embodiments of the invention also relates to a further method for reducing occurring oscillation effects of a part of a measuring device. The invention also relates to the method for providing an active damping functionality for at least a part of a coordinate measuring machine (CMM). The coordinate measuring machine comprises a base, a probe head, a machine structure with structural components for linking the probe head to the base and at least one driving unit for providing movability of the probe head relative to the base. A dynamic state information is provided for at least a part of a coordinate measuring machine.

According to that issue of the invention, the coordinate measuring machine comprises a controllable actuator for applying a defined force. Moreover, the method comprises deriving an actual state of at least the part of the coordinate measuring machine by a determination based on the dynamic state information and determining a controlling parameter based on the derived actual state, the controlling parameter being adapted to provide controlling of the actuator so that the actual state is affected in defined manner.

For respective application of a defined force, a respective controlling signal can be applied to the actuator, the controlling signal being derived based on the controlling parameter.

According to embodiments of the invention, the actuator is attached to one of the structural components, the probe head or the base, wherein the force is producible at the respective component. Of course, it is to be understood that more than one of such actuators can be attached to the CMM and thus provide a larger spectrum of application of defined forces.

Concerning the dynamic state information about the CMM such information can be provided in several ways. The dynamic state information for at least the part of a coordinate measuring machine can be provided by means of a dynamic model with a set of model state variables, the model state variables being related to a set of physical properties of at least the part of the coordinate measuring machine and representing an actual state of at least the part of the coordinate measuring machine.

Moreover, the dynamic state information for at least the part of a coordinate measuring machine can also be derived by use of an observer. Alternatively or additionally, the set of model state variables of the model may be derived based on such observer(s), i.e. particularly an observer can be implemented with the dynamic model.

In that context, in particular, the actual state of at least the part of the coordinate measuring machine can be derived by a calculation based on the dynamic model and/or such observer(s).

According to an alternative or additional approach, the dynamic state information for at least a part of a coordinate measuring machine is provided by means of a measurement by a sensor unit, in particular wherein the sensor unit comprises an acceleration sensor. Using an accelerometer for such measurement an oscillation of a machine part can directly be measured and provided to the method as an input variable for determining the controlling parameter.

Such respective sensor unit can be attached to one of the structural components, the probe head or the base.

In particular, the sensor unit and the actuator are attached to the same part of the coordinate measuring machine and are positioned closely to each other. Such a design enables a very direct measuring of a machine vibration and applying a reaction by the actuator especially at the position where the vibration occurs. Thus, a direct damping can be further improved.

Alternatively, information provided by one or more sensor units and by the dynamic model or observer may be combined in order to provide respective controlling of the actuator.

According to a further embodiment of the invention, also information about a planned moving path for the probe head is used for deriving the actual state. Such information typically can be provided by a part program for measuring a desired work piece.

Concerning the actual state of the coordinate measuring machine or a part of it, more specifically oscillation information about an actual oscillation of at least the part of a coordinate measuring machine can be derived based on the dynamic state information, in particular wherein the actual oscillation represents the actual state. Thus, knowledge about actual oscillations or vibrations of machine parts can be provided by calculation (model-based) and/or measurement (sensor-based) and/or a combination of both.

Furthermore, the controlling parameter can be determined based on the derived oscillation information and, based on the controlling parameter, a damping actuation can be provided by the actuator by inducing a defined force counteracting the actual oscillation.

The actuator can be designed as a voice coil, a piezo unit or a memory metal element and/or as a pneumatic element.

The invention concerning the use of an active actuator also relates to a coordinate measuring machine comprising a base, a probe head, a machine structure with structural components for linking the probe head to the base, at least one drive mechanism for providing movability of the probe head relative to the base and a controlling and processing unit adapted for providing a dynamic state information for at least a part of a coordinate measuring machine.

According to some embodiments of the invention, the coordinate measuring machine comprises a controllable actuator for applying a defined force and the controlling and processing unit is adapted to provide execution of an active damping functionality. The active damping functionality comprises deriving an actual state of at least the part of the coordinate measuring machine by a determination based on the dynamic state information and determining a controlling parameter based on the derived actual state, the controlling parameter being adapted to provide controlling of the actuator so that the actual state is affectable in defined manner.

In particular, the controlling and processing unit and/or the actuator of the coordinate measuring machine are adapted for execution of a method (using an actuator) as describe before.

Some embodiments of the invention concerning the use of an actuator also relates to a respective computer programme product having computer-executable instructions for performing said method, in particular when run on a controlling and processing unit of a coordinate measuring machine.

Some embodiments of the invention also relates to a further method for avoiding and reducing excitation of vibrations or oscillations of at least a part of a measuring device. That method corresponds to a method for controlling of a relative movement of a first structural component and a second structural component of a measuring device, the measuring device comprising a driving unit for providing movability of the first and second structural components relative to each other. The method comprises moving the structural components relative to each other according to desired movement by applying a controlling signal to the driving unit and filtering the controlling signal concerning a known frequency response (oscillation behaviour) related to a physical property of at least one of the structural components by use of a frequency-filter element.

According to some embodiments of the invention at least the second structural component is designed comprising a (at least one) variable physical property, in particular depending on a relative position of a moveable sub-structure attached to the second structural component (which leads to a physical property depending variable oscillation behaviour (natural frequency)), and the frequency-filter element is designed being adaptable (tunable) with respect to a filterable frequency range.

Additionally, the variable physical property of the second structural component is continuously monitored, in particular by calculation and/or measurement, and, based thereon, a change of the physical property is determined. Moreover, an actual frequency response (actual oscillation behaviour) of at least one of the structural components is derived based on the determined change of the physical property, wherein at least one relevant frequency region is determined, and the filterable frequency range is continuously (in particularly automatically) adapted according to the at least one relevant frequency region.

In particular, the frequency-filter element is designed as a notch filter, lead-, lag-, BiQuad, low-pass, high-pass-filter, or any combination thereof, wherein the filter can be implemented in context of an overall control loop for the measuring device. In particular, the filter is implemented as a digital FIR or IIR filter, wherein the filter coefficients are adapted pose dependent to take into account or to match the natural frequency and/or damping variation according to the pose (position of the moveable sub-structure relative to the second structural component).

According to an embodiment of the filtering method according to the invention, a control loop for controlling the driving unit is provided, wherein the controlling signal is provided as an output signal of the control loop.

In particular, the frequency-filter element is implemented in the control loop and/or is designed as a separate controlling element being (logically) placed ahead or behind the control loop.

Moreover, the frequency-filter element can be implemented in the control loop so that an excitation of an oscillation relating to the relevant frequency region is reduced or avoided. That is preferably provided by filtering the controlling signal using the frequency-filter element and thus providing a pre-filtered signal to the driving unit. By doing so, the actuation of the driving unit is adjusted so that reduced or no oscillations emerge when moving the structural components.

With other words, the frequency-filter element is designed and adapted with respect to the filterable frequency range so that an excitation of oscillation of at least one of the structural component is reduced or avoided within limits of the relevant frequency region.

According to a preferred embodiment of the present invention, an adaptation of the frequency range is provided by varying filter parameters assigned to the frequency-filter element. Thus, the filter element may be adapted by only changing the filter parameters but keeping an actual state value constant. This provides a fast and precise switching of filtering properties of the filter, whereby a reliable and continuous oscillation-reduced controlling of the device is enabled.

Concerning the determination of the frequency response or oscillations and the adjustment of respective damping the filtering method can be designed to derive the actual frequency response or oscillation behaviour and/or adapt the frequency-filter element based on a calculation using the determined change of the physical property or using an actual physical property derived from the determined change of the physical property. Additionally or alternatively, such may be provided based on a look-up table providing a correlation of the actual frequency response and the change of the physical property or the actual physical property and/or based on a look-up table providing a correlation of the relevant (oscillation-) frequency region and the change of the physical property or the actual physical property. In particular an interpolation of values of the look-up table is applied.

With view to the physical property, the physical property may be represented by at least one (or a combination) of the group of following physical properties:
acceleration, in particular rotational,
velocity, in particular rotational,
pose,
deflection,
torque,
force,
mass,
mass distribution,
stiffness and/or
stiffness distribution,
in particular wherein the physical property is determined by a sensor-based measurement.

The information about the physical property (or the state of the measuring device) can be provided by means of a dynamic model with a set of model state variables, the model state variables being related to a set of physical properties of at least the part of the coordinate measuring machine and representing an actual state of at least the part of the coordinate measuring machine.

Moreover, the information about the physical property (or state) can also be derived by use of an observer. Alternatively or additionally, the set of model state variables of the model may be derived based on such observer(s), i.e. particularly an observer can be implemented with the dynamic model.

Now referring to the types of measuring devices being controllable according to the state-space controlled approaches of above, the measuring device can be embodied as a coordinate measuring machine comprising a base, a probe head, machine structure for linking the probe head to the base and at least one drive mechanism for providing movability of the probe head relative to the base, the drive mechanism representing the driving unit, wherein the first and/or the second structural component is embodied as the base, the probe head and/or the machine structure.

Alternatively, the measuring device can be embodied as a geodetic measuring instrument, in particular laser scanner, laser tracker or total station, with a support structure being mounted on a base of the measuring instrument such that the support structure is pivotable about a first axis defined by the base, a source of electromagnetic radiation for generating a measuring beam, a directing unit for directing the measuring beam, the directing unit being arranged at the support structure as to provide pivotability of the directing unit about a second axis defined by the support structure, the second axis being basically perpendicular to the first axis, and a measuring functionality for providing directing and guiding of the measuring beam in a predefined manner and measuring distances correspondingly. The first and/or the second structural component are embodied as the base, the support structure and/or the directing unit.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, some embodiments of the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm. Furthermore, the invention also relates to coordinate measuring machines with rotational axis, such as the Scara-type and delta kinematics (parallel kinematics) and machine with articulated heads.

The embodiments of the invention also relate to a coordinate measuring machine comprising a base, a probe head, a machine structure with at least a first and a second structural component for linking the probe head to the base (in particular wherein the base and/or the probe head is represented by one of the structural components), at least one drive mechanism for providing movability of the probe head relative to the base, a frequency-filter element and a controlling and processing unit. The controlling and processing unit is adapted to provide moving of the structural components relative to each other according to desired movement by applying a controlling signal to the driving unit and to perform filtering the controlling signal concerning a known frequency response related to a physical property of at least one of the structural components by use of the frequency-filter element.

According to some embodiments of the invention, at least the second structural component provides a variable physical property, in particular depending on a relative position of a moveable sub-structure attached to the second structural component, and the frequency-filter element is designed being tunable with respect to a filterable frequency range. Additionally, the controlling and processing unit is adapted to provide execution of a filtering functionality. The filtering functionality comprises monitoring the variable physical property of the second structural component and, based thereon, determining a change of the physical property, deriving an actual frequency response of at least one of the structural component based on the determined change of the physical property, wherein at least one relevant (oscillation) frequency region is determined, and adapting the filterable frequency range according to the at least one relevant frequency region.

In particular the controlling and processing unit of the coordinate measuring machine is adapted for execution of a method using a frequency-filter described above.

According to a specific embodiment of the invention, the frequency-filter element is represented by a notch filter with a variably settable filterable frequency range by changing respective filter parameters.

The invention also relates to a computer programme product having computer-executable instructions for performing the filtering method of one above, in particular when run on a controlling and processing unit of a coordinate measuring machine.

Of course, it is to be understood, that above and below described individual approaches of controlling movement of several parts of a measuring machine or of damping such machine parts using an actuator can be combined and simultaneously be applied to a measuring machine like a CMM. E.g. a state-space controller is combined with a controllable actuator or a frequency-filter element for providing even better measuring conditions.

BRIEF DESCRIPTION OF THE DRAWINGS

The methods and the devices according to the invention are described or explained in more detail below, purely by way of example, with reference to working examples shown schematically in the drawings. Specifically.

DETAILED DESCRIPTION

Figure 1:
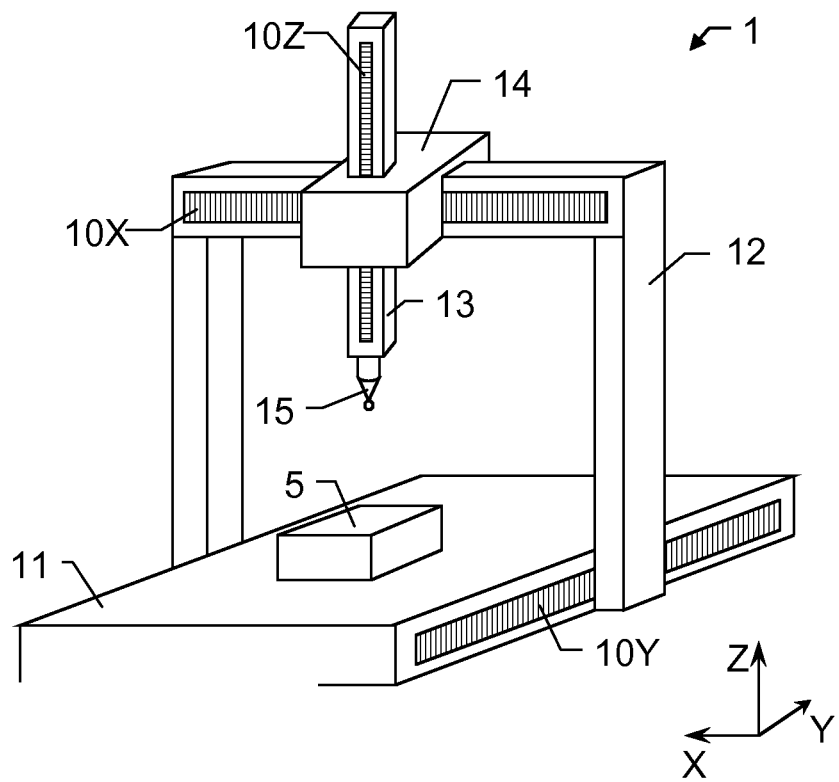
FIG. 1 shows a first exemplary embodiment of a coordinate measuring machine according to the invention.

In FIG. 1 an exemplary embodiment of a portal coordinate measuring machine 1 (CMM) according to the invention is depicted, the coordinate measuring machine 1 comprises a base 11 and a frame structure for linking a probe head 15 to the base 11, the frame structure comprising several frame components 12,13,14 being movable with respect to another. The first frame component 12 is a portal having two portal legs, which are connected by a bridging portion at their upper ends. Driven by a drive mechanism (not shown), the frame component 12 is capable to move along the longitudinal sides of the base 11. This direction corresponds to a first direction X. The movement of the frame component 12 particularly is performed by a gear rack attached to the base 11, which is meshing with a pinion on the frame component 12.

A carriage 14 is movably arranged on the bridging portion of the frame component 12. The movement of the carriage 14 (which is to bee seen as a further frame component) may also be achieved by a rack and pinion. A vertical rod 13 (sleeve, Z-ram), building a further frame component, is movably incorporated into the carriage 14. At the bottom portion of the vertical rod 13 a probe head 15 is provided.

The probe head 15 is movable to any desired point in a measuring volume (work zone) of the coordinate measuring machine 1 in the directions X, Y and Z. The measuring volume is defined by the base 11 and the frame components 12,13 and in particular by the range of movability of the carriage 14. The three space directions X, Y and Z are preferably orthogonal to one another, although this is not necessary for the present invention. It should be noted that a drive mechanism and a controller for driving the frame components and, thus, for driving the probe head 15 are not shown.

An object 5 to be measured is positioned in the space of the measuring volume on the base 11.

The probe head 15, on which a stylus is arranged exemplarily, is fastened on the lower free end of the rod 13. The stylus is used in a manner known per se for touching the object 5 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 15 may be designed for arranging a contact probe, e.g. a scanning or touch trigger probe, or a non-contact probe, particularly an optical, capacitance or inductance probe, and/or an articulated probe.

Two of the most common types of bearings between the movable members and the guides are air bearings or ball bearings (e.g. linear circulating plus rails). The air bearings give the advantage that there is no friction in the movement (which may introduce different kind of errors like angle errors or hysteresis). The disadvantage of air bearings is that the stiffness is lower than in ball bearings, so that particularly dynamic errors may occur. In ball bearing types, the stiffness in the bearing system is typically higher but there is friction and the friction forces may introduce errors. However, the invention may be applied for both types of bearings.

Summed up, the coordinate measuring machine 1 is built for determination of three space coordinates of a measurement point on an object 5 to be measured and, therefore, comprises three linear drive mechanisms for provision of movability of the probe head 15 relative to the base 11 in the first, second and third direction (X, Y and Z direction) and particularly machine components providing additional rotatory degrees of freedom (e.g. articulated probe).

Each linear drive mechanism has a linear guide, one in the first, one in the second and one in the third direction (X, Y and Z direction), respectively. In a simple embodiment, the linear guide of the Y-direction drive mechanism is formed by two edge-building surfaces of the base 11, the linear guide of the X-direction drive mechanism is formed by two or three surfaces of the bridge and the linear guide of the Z-direction drive mechanism is formed by a cubical hole in the X-carriage member.

Furthermore, each linear drive mechanism comprises a movable member being supported for movement along the guide by bearings. In particular, the movable member of the Y-direction drive mechanism is embodied as Y-carriage having mutually facing surfaces with respect to the above mentioned two or three guiding surfaces of the base 11. The movable member of the X-direction drive mechanism is embodied as X-carriage 14 having mutually facing surfaces with respect to the above mentioned two or three guiding surfaces of the bridge. And, the movable member of the Z-direction drive mechanism is formed by Z-column 13 (sleeve) having mutually facing surfaces with respect to the inner surfaces of the cubical hole in the X-carriage. In scope of the present invention, it is to be understood that the facing surfaces are not restricted to form a cubical hole but also may be arranged in a more general way.

Moreover, each linear drive mechanism comprises a linear measuring instrument for determination of a first, a second or a third drive position, respectively, of each movable member in the first, the second or the third direction (X, Y and Z direction), respectively.

In this exemplary embodiment of FIG. 1, the portal legs each have a movable Y-carriage which allows movement of the first frame component 12 in Y-direction.

A measuring scale 10Y being part of the Y-measuring instrument is schematically represented on the long side of the base 11, wherein the scale 10Y extends parallel to the Y-direction. The scale may be a glass measuring scale, e.g. having incremental or absolute coding, with which a drive position in the Y-direction of the Y-carriage can be determined. It is to be understood that the measuring instrument may furthermore contain suitable sensors for reading the measuring scale 10Y, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10X is arranged parallel to the X-direction on the bridging portion of the first frame component 12. Finally, another measuring scale 10Z is also arranged parallel to the Z-direction on the Z-ram 14. By means of the measuring scales 10X,10Z as part of the linear measuring instruments, it is possible to record the present drive positions of the second frame member 14 in X-direction and of the sleeve 13 in the Z-direction metrologically in a manner which is known per se.

In the shown embodiment, the base 11 comprises a table with a granite surface plate for supporting the object 5 to be measured, on which the space coordinates of the measurement point are intended to be determined.

Not shown is a controlling and processing unit, which is designed to actuate the motor drives of the coordinate measuring machine 1 so that the probe head 15 travels to the measurement point. The controlling and processing unit comprises a processor and a memory. In particular, the controlling and processing unit is designed for determining the three space-coordinates of the measurement point on the object 5 as a function of at least the first, the second and the third drive position of the three drive mechanisms.

For manual operation, the control unit may be connected to a user console. It is also possible for the control unit to fully automatically approach and measure measurement points of the object 5 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm. Furthermore, a respective CMM may comprise an articulated probe head, a rotary table or rotary axes or may be a Scara-type machine.

Furthermore, a CMM in context with the present invention also is to be understood as a system for precise positioning and/or precise assembling of work pieces or tools and/or for applying materials, e.g. spraying or printing of paint or other materials. Such a system is designed to provide movement and measurement of positions within a working volume defined by the structure of the respective system and defines a coordinate system, within which positioning of system components with high precision is provided. In particular, such a system provides carrying and placing of a work piece or a tool relative to a further work piece with high accuracy. For instance, a robot providing precise positioning and/or measuring abilities may be operated and controlled based on execution of the dynamic model according to the invention.

Moreover, according to the invention, the controlling and processing unit may comprise a functionality for dynamical—in particular continuously—calculating deflections of the coordinate measuring machine 1 on basis of a model which represents physical parameters of (at least a part of) the CMM 1. For such dynamic calculation an excitation of the CMM 1 and/or an external impact on the CMM 1 is monitored (e.g. by measuring physical properties or by calculation of the parameter) and system variables are updated according to the monitoring. That process of monitoring and updating the parameters is performed in defined time intervals. Thus, a change of respective system parameters and relating physical properties (i.e. the value of a physical property) is determined and additionally stored in a database and a calculation of the deflections can be performed based on that model with values from the database. By considering the history of several physical parameters, which are set for representing at least the part of the CMM 1 by the model over time, a real dynamic calculation of occurring deformations and/or vibrations at the CMM 1 can be done and errors caused by that deflections can be compensated for. Natural frequencies are enabled to be calculated and their influences can be mathematically corrected as well.

Moreover, according to an alternative approach of modelling the coordinate measuring machine, the controlling and processing unit may comprise a functionality for dynamical—in particular continuously—calculating deflections of the coordinate measuring machine 1 on basis of a model, the model representing at least a part of the CMM 1 by defined state variables. For deriving a precise state of the CMM 1 a filtering process, in particular using Kalman-filtering, is executed, wherein based on the state variables further prediction variables (estimates) are derived describing an expected successive state of the CMM 1. Additionally, some state variables or physical properties, respectively, are monitored, e.g. by measuring the physical properties, and variations concerning the values of respective state variables are determined. In a further step of the filtering process, the monitored variables (with determined variations) are compared to the prediction variables and based on the comparison a successive new set of state variables is derived. These variables represent the proximate (i.e. successive) state of the CMM 1. For instance, the comparison of the variables can be done by calculating weighted averages, wherein more weight may be given to variables with higher certainty.

The successive set of state variables is taken for updating the model. Thus, a previous set of variables is actualised based on the successive variables, in particular wherein previous variables are replaced by successive variables. For instance, a former value regarding a force at the CMM 1 is replaced by an actualised force value.

The successive state of the CMM 1 can then be calculated depending on the successive set of variables or depending on the actualised model, respectively. Thus, e.g. an actual bending or torsion of the CMM 1 or of at least the part of the CMM 1 can be derived as the successive state. Moreover, a displacement of a structure or of a designated point of the CMM 1 can be calculated and, from that, an error information concerning a displacement of the probe (or probe head 15) of the CMM 1 can be generated. Optionally, according to a further specific embodiment of the invention, a measurement values is compensated using the error information.

According to an embodiment, above calculation (using calculated estimates and measured variables) is executed recursively by continuously updating modelling parameters (variables) and repetitively calculating the actual state of the machine with actual parameters. Therefore, a historical development of one or more model parameters can be neglected and the variables are to observed and stored for only one time-step (e.g. from a first to a second calculation of the machine state), wherein the time-step to be performed may be adapted for each calculation, i.e. a time steps may be skipped or alternating time steps are used.

Furthermore, the modelling approach enables to track a state of at least a part of a CMM 1 and to derive a deformation or displacement of the part, respectively. Hence, defining a model and performing filtering of physical parameters and calculating an actual state of a CMM 1 allow reduction of errors due to the dynamic behaviour of the CMM 1. Above described functionality provides an improved and precise basis for dynamically modelling machine parameters and for calculating and, particularly, correcting or compensating for deflections, i.e. for dynamically changing deflections.

Such a modelling approach is e.g. known from and described in more detail in EP 2 762 831 A1.

Above described functionalities provide an improved and precise basis for dynamically modelling machine parameters and for calculating and, particularly, correcting or compensating for deflections, i.e. for dynamically changing deflections.

Above approaches of defining a model and performing monitoring of physical parameters and calculating an actual state of a CMM 1 allow reduction of errors due to the dynamic behaviour of the CMM 1. At least these two approaches are to be understood as representing dynamic models which are intended to be used in context of the present invention for proving actual states of a CMM or any other kind of measuring device.

With other words, when referring to a dynamic model within the present application, preferably one of above described modelling methods provides the bases for calculation based on the respective dynamic model.

According to a first preferred embodiment of the invention, the processing and controlling unit provides an improved controlling of a relative movement of at least two structural components of the measuring device. The measuring device may be embodied as a CMM but—according to an alternative embodiment—may also be in form of a surveying instrument or any other kind of measuring device.

Dynamic state information is provided for at least one of the two structural components by means of a dynamic model with a set of model state variables. The dynamic model may be implemented according to one of the models described above. Moreover, a model-based state controller is provided for controlling the driving unit of the measuring machine 1.

The input parameter or basic information for the state controller is a type of information about an actual state of the measuring device 1, which can be derived by use of the dynamic model. Such actual state may be an actual oscillation or bending of at least one part of the measuring device 1. The actual state depends for instance on accelerations of moving parts of the CMM, on a particular mass of a moving part and/or on a natural frequency of such a part.

Based on a determined actual state of the machine 1 and thus having knowledge about the input controlling state variable, a controlling parameter is generated on side of the state controller by means of a model based calculation. The controlling parameter is derived so that the actual state is influenced in defined manner on usage of the controlling parameter for driving the structural elements relative to each other.

In particular, the controlling parameter provides a motor-movement of the driving unit so that a countermovement of the one of the structural components relative to a second component is induced, in particular wherein a counter-oscillation is induced by a respective controlling of the motor (e.g. an oscillation with a particular phase shift).

According to a second preferred embodiment of the invention, the processing and controlling unit of the coordinate measuring machine 1 provides an improved active damping functionality for the machine 1. Here, the CMM comprises an actively controllable actuator (not shown) for applying a defined force to the system. The actuator may for instance be attached to one of the legs 12, the Z-ram 13 or the probe head 15.

The actuator is controllable by use of respective controlling parameters which provide a defined controlling of actuations by enabling generation of a respective controlling signal. In addition, dynamic state information for at least a part of a coordinate measuring machine is provided. Such dynamic state information may be provided by a dynamic model of above which precisely describes a dynamic behaviour of the CMM 1 or by a measurement using a sensor unit attached to the CMM 1, in particular attached closely to the actuator in order to supply a good correlation of measuring information and actuation. With other words, a measured action of the CMM (by the sensor) and an induced reaction by the actuator based on the measured action are closely correlated.

Furthermore, based on the provided dynamic state information, an actual state of at least a part of the CMM 1 can be derived. The actual state e.g. represents a vibration, bending, distortion, displacement etc. or a combination thereof. The controlling parameter is determined based on the derived actual state, wherein the controlling parameter is adapted to provide controlling of the actuator so that the actual state is affected in defined manner, i.e. for instance the actuator is controlled to generate a force which counteracts a determined oscillation.

According to a third preferred embodiment of the invention, the processing and controlling unit of the coordinate measuring machine 1 provides an improved controlling of movement of a first structural component (e.g. a portal leg 12) relative to a second structural component (e.g. the X-beam) of a measuring device, in particular the CMM 1.

Here, a frequency-filter is provided by the measuring machine. The two structural components are moved relative to each other based on a controlling by the controlling and processing unit, wherein the controlling signal is filtered with respect to known oscillation behaviour of at least one of the structural components.

Additionally, the second structural component comprises a design which provides a physical property of that element to be variable, i.e. the physical property can vary over time. In particular, the physical property is related to a centre of mass of the component, e.g. depending on a position of a further element being movably attached to the second component. Thus, consequently, a resonance or natural frequency of the second structural element changes with a change of that physical property as well.

Based on the information about a change of the physical property (provided by a monitoring process) the oscillation behaviour at least of the respective component can be derived (e.g. by model-based calculation (using a model of above) or using a respective look-up table). As the frequency-filter is designed to be variable with view to a frequency or a frequency band to be filtered, the filtering properties of the filter can be adapted (by the controlling unit) for fitting to the actual oscillation behaviour of the structural element.

In addition, the frequency-filter can be adjusted as to its damping properties. This means, as the actual oscillation behaviour of the structural element is derived and thus also information about the oscillation magnitude may be provided, an amount (power or strength) of damping provided by the frequency-filter element may be adapted accordingly.

By doing such filtering adaptation, the controlling signal is filtered which correspondingly results in a non-excitation of respective frequencies when moving the components relative to each other. The motor of the driving unit is controlled so that respective frequencies are not excited within the machine structure. Such method reduces or finally even avoids occurring of resonances and oscillations with large amplitudes.

Figure 2:
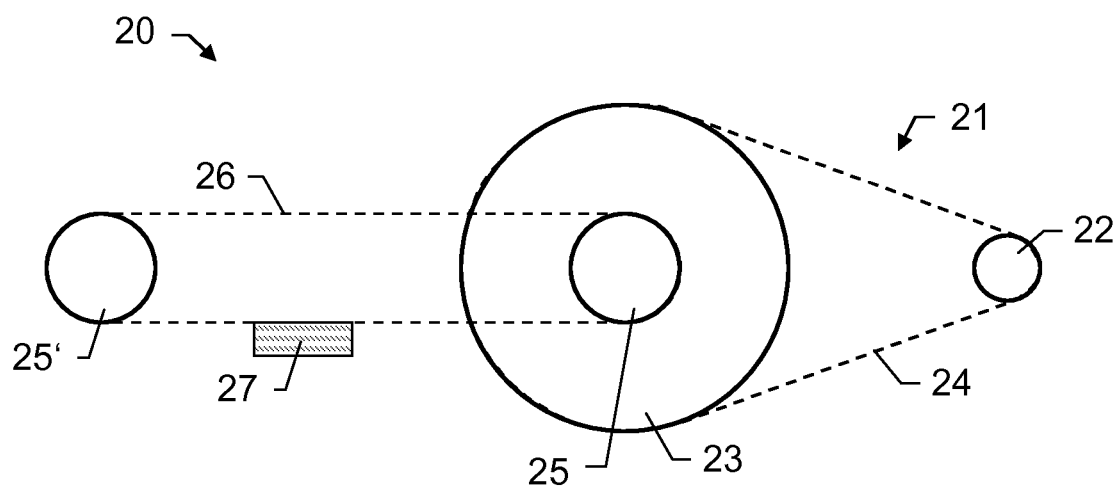
FIG. 2 shows a schematic model of a driving unit of a measuring machine.

FIG. 2 shows a schematic model of a driving unit 20 of a measuring machine, in particular of a coordinate measuring machine or a geodetic instrument.

The model represents the driving unit 20 comprising a transmission 21 provided by a small pulley 22, a large pulley 23 and a transmission belt 24. The small pulley 22 is connected to a motor which provides rotation of the small pulley 22 with defined velocity, accelerations and rotation direction. In particular a speedometer is connected to the motor.

Moreover, the model comprises a description of a driven part of the measuring machine. There are two more pulleys 25 and 25', one of which (25) is fixed together with the larges pulley 23 thus providing a gear stage. A linear belt 26 is supported by the pulleys 25,25', wherein a mass 27 is attached to the belt 26 in order to be moveable by controlling the motor. The mass 27 may represent another structural sub-element being driven by the belt. E.g. the mass 27 can represent another moveable and more complex part of the machine with respect to an axis which the mass 27 is to be moved along. The part may comprise certain properties which partly are variable like mass, inertia or flexibility, in particular multiple state space representations might describe the deflection status of that part.

Such model for instance enables to determine the state of driving the Y-axis of a coordinate measuring machine (see also FIG. 1). The mass 27 and/or e.g. an inertia also represented by the mass element 27 represents the bridge to be moved corresponding to particular model state variables. Such state variable may be provided by different dynamic models each of which allowing determination of at least one of the state values. Furthermore, the belt 26 is represented by a collection of mass components and defined elasticities. The pulleys 25 and 25' may be represented by defined inertia parameters. In addition, the transmission belt 24 and the pulleys 22 and 23 may be implemented as elastic elements and further inertial components. In particular, an angle parameter is addressed to the motor or the small pulley 22.

Using such a modelling approach, an overall control system for driving the Y-axis is provided, wherein additional and corresponding models for further machine axis may be provided and contribute to the overall control.

With view to application of the method according to the invention to a Y-drive of a CMM, damping of torsions of the X-beam around a first leg can be provided. Moreover, damping of rotation of the Z-ram (plus carriage) around the X-beam and a damping of bending of the supporting leg with respect to X-beam (rotation around X-axis) may be realised as well. It is to be understood in context of the present invention that the application of the state-controlled method is not limited to the Y-drive but may correspondingly implemented for the X- and/or Z-drive.

The model provides determination of several sub states or machine states, e.g. by use of respective observers. For example, respective angular positions or rotation speeds of the pulleys 22,23,25,25' can be measured by respective sensor units (e.g. encoders) and/or observed (e.g. using a Kalman filter) and/or the elastic behaviour of the belt 26 or of other components (e.g. part of 27) is described by the model. Such particular sub-states of the system then can be used for controlling the motor of the driving unit 20. For that, at least one actual sub-state or the actual machine state is provided for a state-space controller of the control loop.

The state space controller uses actual state information as respective controlling state variables and at least one target parameter as inputs and, based thereon, provides an adapted controlling of the motor of the driving unit 20.

The actual state information may relate to one single machine component (e.g. the mass 27) or to a combination of such components and/or may relate to a non-component related property of the machine, e.g. to an oscillation or vibration relating to one machine component or extending over a number of machine components.

The schematic model of a driving unit 20 may alternatively or additionally comprise machine components being prone to possible deflection.

Based on that approach an unwanted moving behaviour of the mass 27 (e.g. representing the bridge of a CMM), like an oscillation of the mass 27, can be observed (by measurement and/or model-based) and can be counteracted by generating a respective counterforce using the motor. With other words, the motor can be controlled so that varying forces are induced in the system, wherein the variation of the forces is temporally adapted to the observed oscillation (frequency) of the mass 27 and is applied with a defined phase shift in order to counteract the oscillation.

As a result, the mass 27 can be kept at one desired position without an oscillation of the mass 27, wherein during keeping the mass 27 at that position the motor (still) induces respective counterforces.

According to a specific embodiment of the invention, the state controller provides the model as described above, i.e. the model builds an implemented component of the state controller.

According to a further embodiment of the invention, the state controller is model-based, wherein the model is based on a black box model or on a fitted and/or parameterised transfer function (e.g. acceleration vs. motor torque). A physical model may be used to properly identify resonances.

Figure 3:
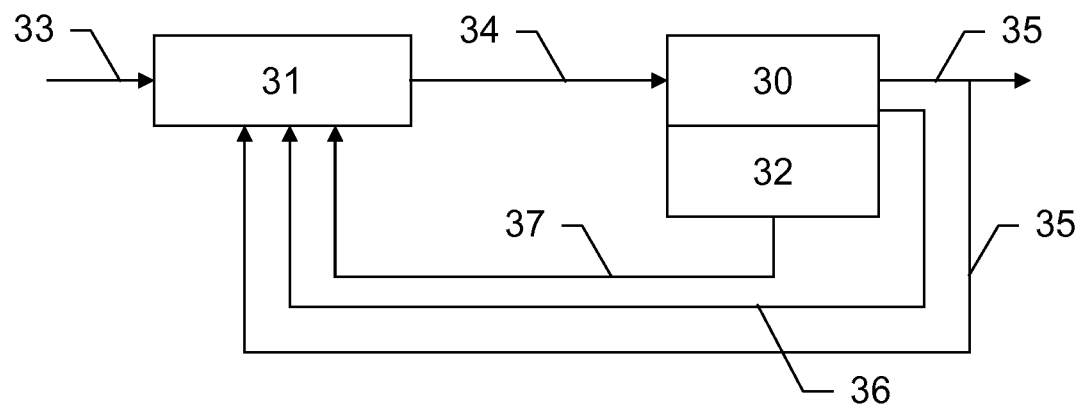
FIG. 3 shows a block diagram illustrating the general principle of use of a model-based state controller in order to control movements or measurements with a measuring device according to the invention.

FIG. 3 shows a block diagram illustrating the general principle of use of a model-based state controller in order to control movements or measurements with a measuring device according to a particular embodiment of the invention.

The respective method of movement controlling comprises a controlled system 30 particularly represented by a dynamic model as above which enables to precisely describe an actual state of the measuring device (e.g. a coordinate measuring machine) by use of respective model state variables. Such model state variables represent physical properties of the measuring machine, e.g. a mass of a structural component (e.g. a carriage or Z-ram) and/or an acceleration of such component and/or a force applied by such acceleration or by an external impact. The model state variables can be derived using an observer 32 for the respective physical properties and/or by model-based estimations or calculations and/or measurements. Here, the observer 32 may provide a determination of a velocity of a structural component. Alternatively, multiple observers (a set of observers) of multiple models can be used for providing the state of the machine to be described.

Moreover, the controller comprises a state(-space) controller 31. According to an exemplary embodiment, a first input for the state controller is in form of a target position 33 (e.g. of a part to be controlled). The state controller 31 provides a target acceleration 34 (and/or current and/or force) to the controlled system 30, wherein the model provides an actual position information 35 as output.

Thus, the actual position information 35 and information about an actual acceleration 36 may directly be provided by the model-based determination of the actual state of the respective part. Moreover, the observer 32 provides actual velocity information 37 to the state controller 31. These three input variables—actual position 35, acceleration 36 and velocity 37 of the respective part to be controlled regarding its target position—are used together with a given target position 33 as input variables to the state controller 31. Based on a combined processing of that given information a target acceleration value 34 is recalculated, updated and provided to the controlled system. It is to be understood that the mentioned states of position 35, acceleration 36 and velocity 37 are exemplarily mentioned.

These states can also be replaced by other machine related states.

By doing so, a target value (here: acceleration, current and/or force) continuously determined by the state controller is provided to the controlled system and used to control a respective driving unit of the system in order to meet the desired target parameters for the part to be controlled.

Figure 4A:
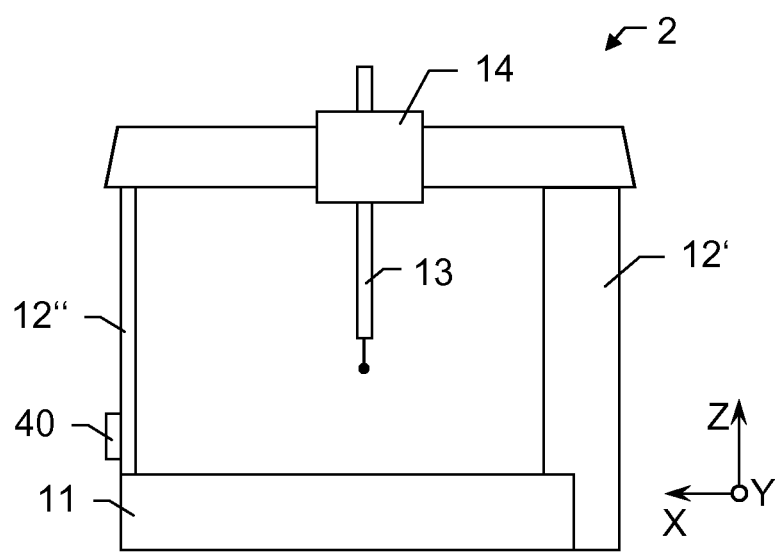
FIG. 4a-b show an embodiment of a coordinate measuring machine (CMM) according to the present invention, wherein an active damping functionality for at least a part of a coordinate measuring machine is provided.

FIG. 4a shows an embodiment of a coordinate measuring machine 2 (CMM) of the present invention, wherein an active damping functionality for at least a part of a coordinate measuring machine 2 is provided by use of an actively controllable actuator 40.

The CMM 2 comprises a base 11, a first leg 12', a supporting leg 12", a carriage 14 supported by the bridge and a Z-ram 13 being movable in Z-direction. The first leg 12' and the supporting leg 12" are part of the bridge. The bridge is moveably in Y-direction, the carriage 14 in X-direction. The actuator 40 is provided for applying a defined force to the supporting leg 12". Of course, it is to be understood that the actuator 40 or additional actuators may be provided at alternative or further machine components (e.g. the Z-ram 13) and that the actuator-related damping functionality thus can be provided for these components, as well.

The CMM 2 is shown in a resting state so that no vibration effects or oscillations occur with the machine and the supporting leg 12" is in a desired position.

Figure 4B:
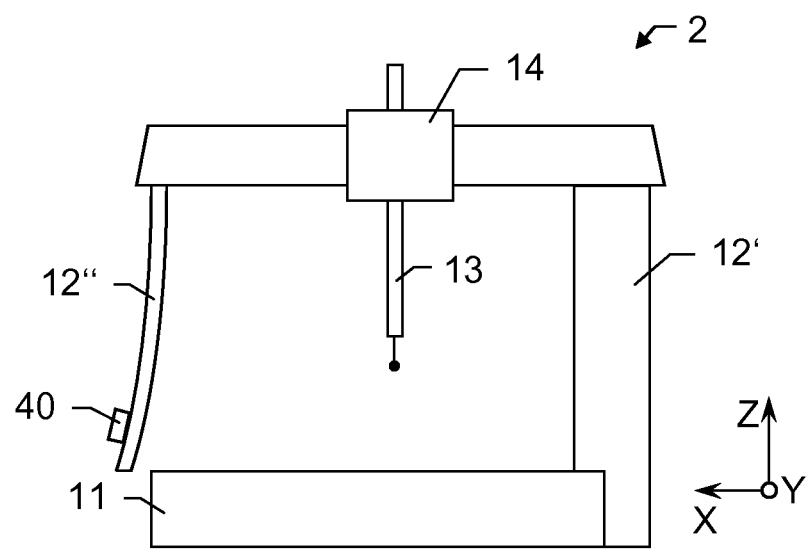

FIG. 4b shows the CMM 2 on a measuring process without applying a force by the actuator 40. As can be seen the supporting leg 12", which typically is designed in non-heavy manner, e.g. according to a light-weight construction, is displaced from its original position. Such a displacement can occur due to oscillations in the system emerging from relative movements of respective machine parts and respective acceleration of these parts. As a result, the supporting leg 12" (or any other machine component like the Z-ram 13) comprises an unwanted bending and thus might influences the accuracy of possible measurements with the CMM 2 significantly.

According to the invention, an actual dynamic state information is provided which describes such oscillations and/or the bending of the supporting leg 12". The dynamic state information may be gathered from a dynamic model which describes the CMM 2 or at least the respective leg 12"

and its behaviour due to machine movements or may be gathered may a sensor based measurement also providing information about the oscillations and/or the bending of the leg 12". A respective sensor (not shown) may be provided at the supporting leg 12", in particular near the actuator 40. The sensor may be designed as an accelerometer or alternative oscillation detecting device.

Having knowledge about the dynamic state of the machine 2 or the leg 12" a corresponding controlling signal is derived, the controlling signal being adapted to control the actuator 40 in defined manner, i.e. controlling the actuator so that a defined force is generated or induced which leads to a reduction or extinction of the oscillation of the leg 12". In particular, the actuator 40 is controlled so that a defined force is induced (e.g. a phase shifted oscillation) which counteracts an acceleration-induced oscillation of the leg 12".

By such controlling of the actuator 40 the supporting leg 12" is kept at its designated position without comprising any significant, i.e. in particular negatively influencing the accuracy exceeding defined requirements, bendings or oscillations (as can be seen in FIG. 4a). As a result, as vibrations in the systems are at least reduced, the overall accuracy for measurements with the CMM 2 is significantly increased.

In particular, the actuator 40 is constructed to provide forces of demanded magnitudes for respective counteraction of occurring distortions etc. Thus, the actuator can be provided with a certain mass which allows counteracting an oscillation at a respective position of the CMM 2.

According to a specific embodiment of the invention, the actuator 40 comprises or is designed as a voice coil. Such voice coils are state of the art and enable generation of precise controlled vibrations at various frequencies to eliminate disturbing vibrations, in particular to actively damp, neutralize or reduce vibrations.

The advantages of voice coils are high accelerations, low moved mass, high reliability, robust design and widespread use e.g. in the "loudspeaker" domain.

Alternative active elements used as the actuator 40 are piezo actuators or memory metal elements and/or pneumatic elements.

The control loop for the CMM 2 could be locally closed with use of an acceleration sensor and the dynamic model. Thus, the performance can be increased by integration of the voice coil and the acceleration sensor into the global control loop to predict vibrations and take into account global movements and accelerations.

However, concerning the damping functionality, at least one sensor may be used, wherein additionally a model based approach is provided. Existing sensors of the CMM 2 can further be used to determine an actual state of the system.

Figure 5:
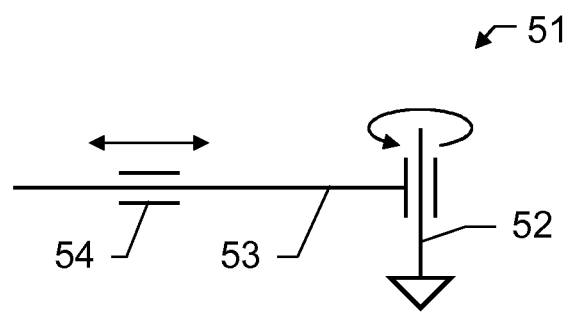
FIG. 5 schematically shows a non-linear mechanism with which a method for filtered controlling of the mechanism according to the invention is applicable.

FIG. 5 schematically shows a non-linear mechanism 51 comprising two structural components 52,53 being designed moveable relative to each other. One of the structural components 53 comprises a sub-structure 54 which is attached moveable relative to the structural components 53.

The principle of such or an alternative non-linear drive mechanism may be provided for driving a coordinate measuring machine or alternative measuring devices. Thus, the method according to the invention as follows (see also FIG. 6) can correspondingly be applied to machines of such types.

The natural frequency of the mechanism 51 relates to the pose of the mechanism 51, to thermal effects and/or to aging. Regarding the pose, the natural frequency especially depends on the position of the sub-structure 54 with reference to the structural components 53. By movement of the sub-structure 54 the mass distribution, in particular the centre of mass, of the second structural component 53 changes accordingly. The natural frequency of that component 53 changes as well. With other words, at least one physical property (mass distribution or resonance frequency) of the structural component 53 changes with a positional change of the sub-structure 54.

As due to such a change of the physical property the resonances of the system change as well, a filtering of a controlling signal for a driving unit of the system has to be adapted accordingly in order to avoid an excitation of (resonance) oscillations.

Today, the use of notch filters with defined filtering properties adapted to defined machine parameters is known from prior art. Furthermore, a (in advance) definition of several machine states combined with respective filter adjustments and a switching of the filter according to respective states is also known. However, this leads to difficulties during the switching between the filters at different working points.

According to the invention, the change of the physical property of at least the respective structural element 53 or the machine and/or a change of the actual state of the machine is observed, in particular continuously. In a next step, an oscillation behaviour (frequency response) of the element 53 (or more machine components) or a change of such behaviour is determined based the derived change of the physical properties. This provides a continuously updated state of the structural component 53 and thus an ongoing and precise identification of natural (resonance) frequencies or respective frequency regions of the component 53.

Using the knowledge about the oscillation behaviour (frequency response) of the structural component 53 and/or further machine components, a specific filtering element provided for controlling the driving unit of the mechanism 51 is dynamically adapted with respect to a frequency or frequency rage to be filtered. Such adaptation of filtering properties is provided by adjusting respective filter parameters pose dependent. The same state values are maintained. Thus, the frequency filtering element is designed to provide a change of its filtering properties by only changing respective filter parameters without the need of providing a change of the machine state.

The filter parameters can be updated continuously in each sampling period or at a certain rate. For that, the update rate of the filter parameters is provided faster compared to a change in the pose, and thus the natural frequency.

The update of the filter parameters can be done in one or combined manner of the following ways:
- calculating the filter frequency and damping online according to the pose of the structural component 53, calculating the corresponding filter parameters and using the new filter parameters in the next step;
- storing the optimal filter frequency and damping for different poses in a table, interpolating the filter frequency and damping according to the current pose and using the new filter parameters in the next step; and/or
- storing the optimal filter parameters in a table for different poses, interpolating the filter parameters according to the current pose and applying them for the next calculation step.

Figure 6:
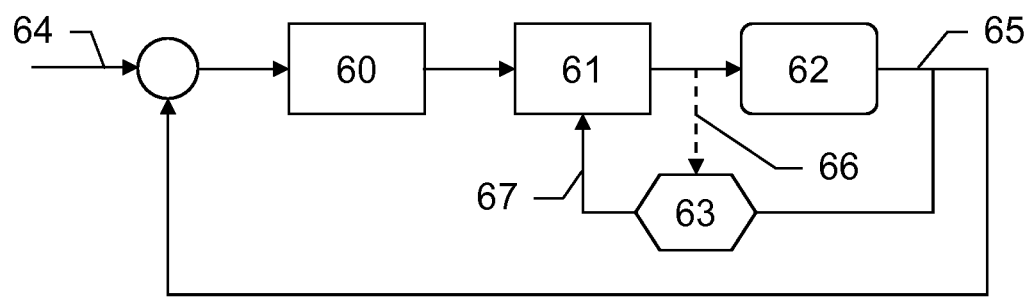
FIG. 6 shows the principle of frequency-filtering for controlling a driving unit of a measuring device according to the invention.

FIG. 6 shows the principle of frequency-filtering with controlling a driving unit of a measuring device according to the invention. An input target signal 64 is provided to a controller 60 which is designed to derive a controlling signal for controlling the driving unit 62 or any other kind of actuator. Additionally, a frequency-filter element 61 is implemented for providing filtering of defined frequencies or a frequency region. Such filtering element 61 may be implemented as a low/high-pass- or lead/lag- or notch- or Kerr-filter or any combination of them.

As shown with FIG. 6 the frequency-filter element 61 is logically positioned in between the controller 60 and the driving unit 62 for pre-filtering the controlling signal in order to avoid excitation of a specific frequency (region). Alternatively, a notch-filter may be implemented as a sub-part of the controller or may logically be arranged prior to the controller 60 for kind of pre-filtering the signal (not shown).

For adapting the frequency to be filtered, information about an actual state of at least one structural component (e.g. oscillation) is required. Such information can be derived based on the output signal 65 behind the driving unit, e.g. by measuring a positional change and/or an actual acceleration and/or based on a desired trajectory position and/or trajectory acceleration, the output signal 65 being supplied to a dynamic model 63.

Alternatively or additionally, an estimation concerning the actual state may be provided by use of the direct output 66 from the filtering unit 61 and model-based estimating calculations. By doing so, an input 67 for the filtering unit 61 is provided by the model 63.

Alternatively, the controller 60 and the model 63 are implemented together in a common controlling element (not shown), wherein both the input for adapting the filter parameters and the controlling signal are generated by such element.

Although the invention is illustrated above, partly with reference to some specific embodiments, it must be understood that numerous modifications and combinations of different features of the embodiments can be made and that the different features can be combined with modelling, compensation or controlling principles and/or coordinate measuring machines known from prior art.

What is claimed is:

1. A method for controlling a relative movement of at least two structural components of a measuring device including a driving unit for providing movability at least of the two structural components relative to each other, the method comprising:
   providing a dynamic state information for at least one of the two structural components by means of a dynamic model with a set of model state variables, the model state variables:
      being related to a set of physical properties of at least one of the two structural components, and
      providing determination of an actual state of at least one of the two structural components;
   providing a model-based state controller for controlling the driving unit, the model-based state controller comprising a set of at least one controlling state variable which depends on the actual state;
   deriving at least one controlling state variable of the set of at least one controlling state variable by a calculation at least based on the dynamic model;
   generating a controlling parameter by use of the state controller based on the at least one derived controlling state variable, the controlling parameter being adapted to drive the driving unit so that the at least one derived controlling state variable or actual state is affected in defined manner, and
   applying the controlling parameter to the driving unit so that the structural components are moved in defined manner relative to each other.

2. The method according to claim 1, further comprising:
   deriving the at least one controlling state variable based on monitoring the model state variable; and
   deriving a particular controlling state variable of the set of at least one controlling state variable by monitoring the model state variable; and
   deriving the actual state by a calculation based on the dynamic model.

3. The method according to claim 1, further comprising:
   deriving the at least one controlling state variable based additionally on a model-based estimation or on a measurement; and
   deriving a particular controlling state variable of the set of at least one controlling state variable at least by a model-based estimation or measurement; and
   deriving the actual state by a calculation based on the dynamic model.

4. The method according to claim 1, wherein at least one controlling state variable of the set of at least one controlling state variable is derived by measuring an excitation or an impact on the measuring device with a sensor or by calculation from a path trajectory.

5. The method according to claim 1, further comprising:
   deriving the actual state for the at least one of the two structural components by measuring or estimating at least one of the physical properties and, therefrom, deriving at least one corresponding actual controlling state variable.

6. The method according to claim 1, wherein the at least one controlling state variable corresponds to the actual state.

7. The method according to claim 1, wherein the state controller comprises an observer which provides determination of the at least one controlling state variable, in particular wherein the observer is provided by a Kalman-Filter.

8. The method according to claim 1, wherein the dynamic model and the model-based state controller are implemented in combined manner.

9. The method according to claim 1, wherein an actual deflection of the measuring device is derived based on the dynamic model.

10. The method according to claim 1, wherein:
    an actual velocity or acceleration of at least a part of the measuring device is derived based on the dynamic model, or
    an actual position of a designated point of the measuring device is derived based on the dynamic model, or
    measuring errors are compensated based on the dynamic model.

11. The method according to claim 1, wherein the measuring device is embodied as a coordinate measuring machine comprising:
    a base,
    a probe head,
    a machine structure for linking the probe head to the base, and
    at least one drive mechanism for providing movability of the probe head relative to the base, the drive mechanism representing the driving unit,
    wherein the structural components are embodied as the base, the probe head, or the machine structure.

12. The method according to claim 1, wherein the measuring device is embodied as a geodetic measuring instrument, with:
    a support structure being mounted on a base of the measuring instrument such that the support structure is pivotable about a first axis defined by the base, a source of electromagnetic radiation for generating a measuring beam, a directing unit for directing the measuring beam, the directing unit being arranged at the support structure as to provide pivotability of the directing unit about a second axis defined by the support structure, the second axis being basically perpendicular to the first axis, and a measuring functionality for providing directing and guiding of the measuring beam in a predefined manner and measuring distances correspondingly.

13. The method according to claim 1, wherein the at least one model state variable defines at least one or a combination of the following factors:
acceleration,
velocity, in particular rotational,
position,
bending,
deformation,
displacement,
orientation,
temperature,
humidity,
torque,
force,
stiffness, and
mass.

14. The method according to claim 1, wherein the change of the at least one controlling state variable or the model state variable is derived by at least one of the following physical properties:
acceleration,
velocity,
position,
deflection,
torque and/or
force.

15. The method according to claim 1, further comprising;
monitoring the physical properties and providing monitored physical properties; and
calculating the actual state of at least the part of the measuring device based on at least the set of model state variables and the monitored physical properties.

16. A computer program product having computer-executable instructions for performing the method claim 1.

17. A coordinate measuring machine with an active damping functionality, the coordinate measuring machine comprising:
a base,
a probe head,
a machine structure with structural components for linking the probe head to the base; at least one driving unit for providing movability of the probe head relative to the base; and
a coordinate measuring machine provided with a dynamic state information and comprising a controllable actuator for applying a defined force, deriving an oscillation information about an actual oscillation of at least the part of a coordinate measuring machine based on the dynamic state information; and determining a controlling parameter based on the derived oscillation information and based on the controlling parameter, providing a damping actuation by the actuator by inducing a defined force counteracting the actual oscillation, wherein an actual state of at least the part of the coordinate measuring machine is determined based on the dynamic state information and the controlling parameter is based on the derived actual state, the controlling parameter being adapted to provide controlling of the actuator so that the actual state is affected in defined manner.

18. A method according to claim 17, wherein the actuator is attached to one of the structural components, the probe head, or the base, wherein the force is producible at the respective component.

19. The method according to claim 17, wherein the dynamic state information is provided for at least the part of a coordinate measuring machine by means of a dynamic model or an observer with a set of model state variables, the model state variables:
being related to a set of physical properties of at least the part of the coordinate measuring machine, and
representing an actual state of at least the part of the coordinate measuring machine.

20. The method according to claim 19, wherein the actual state of at least the part of the coordinate measuring machine is derived by a calculation based on the dynamic model or the observer.

21. The method according claim 17, wherein the dynamic state information is provided for at least a part of a coordinate measuring machine by means of a measurement by a sensor unit.

22. The method according to claim 21, wherein the sensor unit is attached to one of the structural components, the probe head, or the base.

23. The method according to claim 21, wherein the sensor unit and the actuator are attached to the same part of the coordinate measuring machine and are positioned closely to each other.

24. The method according claim 17, wherein the actual state is derived using information about a planned moving path.

25. The method according to claim 17, wherein a controlling signal is applied to the actuator, the controlling signal being derived based on the controlling parameter.

26. The method according to claim 17, wherein the actuator is designed as a voice coil, a piezo unit, a memory metal element, or a pneumatic element.

* * * * *